(12) United States Patent
Choi et al.

(10) Patent No.: US 9,819,473 B2
(45) Date of Patent: Nov. 14, 2017

(54) OPERATION METHOD OF STATION IN WIRELESS LOCAL AREA NETWORK

(71) Applicant: Electronics & Telecommunications Research Institute, Daejeon (KR)

(72) Inventors: Jee Yon Choi, Daejeon (KR); Jae Seung Lee, Daejeon (KR); Jae Woo Park, Daejeon (KR); Yu Ro Lee, Daejeon (KR); Ii Gyu Kim, Chungcheongbuk-do (KR); Seung Chan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 14/818,893

(22) Filed: Aug. 5, 2015

(65) Prior Publication Data

US 2016/0044676 A1 Feb. 11, 2016

(30) Foreign Application Priority Data

Aug. 8, 2014 (KR) .................. 10-2014-0102569
Jul. 14, 2015 (KR) .................. 10-2015-0099635

(51) Int. Cl.
| | |
|---|---|
| *H04L 5/00* | (2006.01) |
| *H04L 27/26* | (2006.01) |
| *H04W 72/12* | (2009.01) |
| *H04W 84/12* | (2009.01) |

(52) U.S. Cl.
CPC .......... *H04L 5/0092* (2013.01); *H04L 5/0048* (2013.01); *H04L 27/2613* (2013.01); *H04W 72/1289* (2013.01); *H04L 5/0023* (2013.01); *H04L 5/0039* (2013.01); *H04W 84/12* (2013.01)

(58) Field of Classification Search
CPC . H04L 5/0092; H04L 5/0048; H04L 27/2613; H04W 72/1289
USPC .................................................. 370/328, 329
See application file for complete search history.

(56) References Cited

U.S. PATENT DOCUMENTS

| | | |
|---|---|---|
| 2011/0075759 A1 | 3/2011 | Seok |
| 2011/0110454 A1 | 5/2011 | Sampath et al. |
| 2013/0044742 A1 | 2/2013 | Zhang et al. |
| 2013/0136157 A1 | 5/2013 | Son et al. |
| 2014/0307650 A1* | 10/2014 | Vermani ............... H04L 5/0044 370/329 |

FOREIGN PATENT DOCUMENTS

| | | |
|---|---|---|
| KR | 10-2009-0124881 A1 | 12/2009 |
| KR | 10-2013-0059686 A | 6/2013 |

* cited by examiner

*Primary Examiner* — Ronald B Abelson
(74) *Attorney, Agent, or Firm* — NSIP Law

(57) ABSTRACT

Provided is an operation method of a station (STA) in a wireless local area network (WLAN). The operation method includes generating a legacy preamble, generating a high efficiency (HE) preamble including scheduling information for a plurality of receiving STAs, and generating a physical layer convergence procedure (PLCP) protocol data unit (PPDU) including the legacy preamble, the HE preamble, and a payload.

16 Claims, 8 Drawing Sheets

OPERATION METHOD OF STATION IN WIRELESS LOCAL AREA NETWORK

CLAIM FOR PRIORITY

This application claims priority to Korean Patent Applications No. 2014-0102569 filed on Aug. 8, 2014 and No. 2015-0099635 filed on Jul. 14, 2015 in the Korean Intellectual Property Office (KIPO), the entire contents of which are hereby incorporated by reference.

BACKGROUND

1. Technical Field

Example embodiments of the present invention relate in general to an operation method of a station (STA) in a wireless local area network (WLAN), and more particularly, to a technology for generation and transmission of a frame supporting orthogonal frequency division multiplexing access (OFDMA) in a WLAN.

2. Related Art

With the development of information and communications technology (ICT), a variety of wireless communication technologies are under development. Among them, a WLAN is a technology that makes it possible to wirelessly access the Internet at home or in companies or specific service providing areas using portable terminals, such as a personal digital assistant (PDA), a laptop computer, a portable multimedia player (PMP), a smart phone, and a tablet personal computer (PC), based on wireless frequency technology The standards for WLAN technology are being developed as Institute of Electrical and Electronics Engineers (IEEE) 802.11 standards. IEEE 802.11a provides a transmission rate of 54 Mbps at 5 GHz using an unlicensed band. IEEE 802.11b provides a transmission rate of 11 Mbps at 2.4 GHz using a direct sequence spread spectrum (DSSS) technique. IEEE 802.11g provides a transmission rate of 54 Mbps at 2.4 GHz by OFDM. IEEE 802.11n provides a transmission rate of 300 Mbps for four spatial streams using multiple input multiple output-OFDM (MIMO-OFDM). IEEE 802.11n supports a channel bandwidth up to 40 MHz, and in this case, provides a transmission rate of 600 Mbps.

As WLANs are widespread and applications using the same are diversified, there is an increasing necessity for a new WLAN technology to support a greater throughput than a data processing rate supported by IEEE 802.11n. Very high throughput (VHT) WLAN technology is one of the IEEE 802.11 technologies proposed to support a data processing rate of 1 Gbps or more. Among them, IEEE 802.11 ac is a standard for providing a VHT in a band of 6 GHz or less, and IEEE 802.11ad is a standard for providing a VHT in a 60 GHz band.

In addition to these, standards for a variety of WLAN technologies have been prescribed, and development of the standards is underway. Typically, IEEE 802.11af is a standard prescribed for operation of a WLAN in an unused television (TV) band (white space), IEEE 802.11ah is a standard prescribed to support a large number of terminals operating with low power, and IEEE 802.11ai is a standard prescribed for fast initial link setup (FILS) in a WLAN system. In recent years, an IEEE 802.11ax standard for improving frequency efficiency in an environment dense with a plurality of base stations and terminals is being developed.

These WLAN technologies can allow the use of wide bandwidths of 80 MHz, a maximum of 160 MHz, etc. to increase a transmission rate. However, a WLAN standard provides backward compatibility with a previous standard, and thus, during communication with a device using a narrow bandwidth, it is not possible to use a remaining bandwidth. In other words, when an access point (AP) is a WLAN device using a wide bandwidth and a STA is a WLAN device using a narrow bandwidth, the AP can simultaneously use a primary channel and a secondary channel, but the STA can use the primary channel only. Therefore, when the AP transmits data to the STA, the AP is required to use the primary channel only, and the secondary channel is not used. This problem also occurs when the STA transmits data to the AP.

SUMMARY

Accordingly, example embodiments of the present invention are proposed to substantially obviate one or more problems of the related art as described above, and provide an operation method of a station (STA) in a wireless local area network (WLAN) which enables a WLAN device using a wide bandwidth to divide a bandwidth and simultaneously exchange data with two or more devices.

Other purposes and advantages of the present invention can be understood through the following description, and will become more apparent through example embodiments of the present invention. Also, it is to be understood that purposes and advantages of the present invention can be easily achieved by means disclosed in the claims and combinations of them.

In some example embodiments, an operation method of a STA in a WLAN includes: generating a legacy preamble; generating a high efficiency (HE) preamble including scheduling information for a plurality of receiving STAs; and generating a physical layer convergence procedure (PLCP) protocol data unit (PPDU) including the legacy preamble, the HE preamble, and a payload.

Here, the HE preamble may include an HE-signal (SIG)-A field, an HE-short training field (STF), at least one HE-long training field (LTF), and an HE-SIG-B field.

Here, the HE preamble may include an indicator indicating that the PPDU is transmitted using an orthogonal frequency division multiplexing access (OFDMA) scheme.

Here, the HE preamble may include identification information of a group to which the plurality of receiving STAs belong.

Here, the scheduling information may include information indicating frequency bands respectively assigned to the plurality of receiving STAs.

Here, the scheduling information may include information indicating bandwidths of frequency bands respectively assigned to the plurality of receiving STAs.

Here, the scheduling information may include identification information of the plurality of receiving STAs respectively assigned a plurality of frequency bands.

Here, the scheduling information may be included in the HE-SIG-A field.

Here, the method may further include transmitting the generated PPDU using an OFDMA scheme.

In other example embodiments, an operation method of a STA in a WLAN includes: acquiring a legacy preamble of a PPDU; acquiring an HE preamble of the PPDU; and acquiring at least one data unit included in a payload of the PPDU through resources indicated by scheduling information for a plurality of receiving STAs included in the HE preamble.

Here, the HE preamble may include an HE-SIG-A field, an HE-STF, at least one HE-LTF, and an HE-SIG-B field.

Here, the HE preamble may include an indicator indicating that the PPDU is transmitted using an OFDMA scheme.

Here, the HE preamble may include identification information of a group to which the plurality of receiving STAs belong.

Here, the scheduling information may include information indicating frequency bands respectively assigned to the plurality of receiving STAs.

Here, the scheduling information may include information indicating bandwidths of frequency bands respectively assigned to the plurality of receiving STAs.

Here, the scheduling information may include identification information of the plurality of receiving STAs respectively assigned a plurality of frequency bands Here, the scheduling information may be included in the HE-SIG-A field.

Here, the method may further include receiving the PPDU using an OFDMA scheme.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
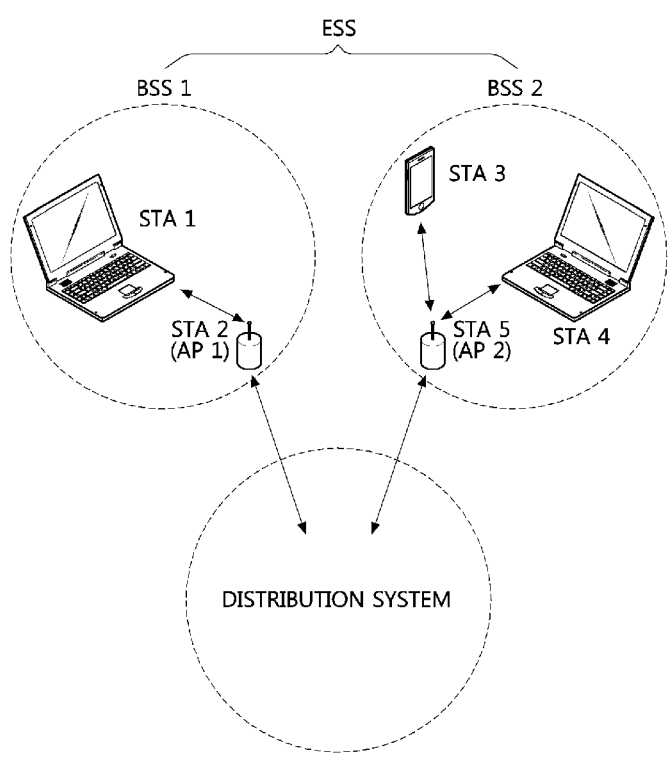
FIG. 1 is a conceptual diagram showing an example embodiment of a configuration of an Institute of Electrical and Electronics Engineers (IEEE) 802.11 wireless local area network (WLAN) system.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

It will be understood that, although the terms "first," "second," "A," "B," etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.). It will be understood that the term "connect" denotes not only a physical connection of an element stated herein but also an electrical connection, a network connection, and so on.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, parts and/or combinations thereof, but do not preclude the presence or addition of one or more other features, numbers, steps, operations, elements, parts, and/or combinations thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in detail with reference to the accompanying drawings. To facilitate general understanding of the present invention, like numbers refer to like elements throughout the description of the drawings, and the description of the same component will not be reiterated.

Throughout the specification, a station (STA) denotes an arbitrary functional medium including an Institute of Electrical and Electronics Engineers (IEEE) 802.11-conformant medium access control (MAC) and physical layer interface for a wireless medium. STAs may be classified as a STA which is an access point (AP) and a STA which is a non-access point (non-AP). A STA which is an AP may be simply referred to as an AP, and a STA which is a non-AP may be simply referred to as a terminal.

A STA may include a processor and a transceiver, and may further include a user interface, a display device, and so on. The processor denotes a unit devised to generate a frame to be transmitted through a wireless network or process a frame received through a wireless network, and performs various functions for controlling the STA. The transceiver is functionally connected with the processor, and denotes a unit devised to transmit and receive a frame through the wireless network for the STA.

An AP may be referred to as an centralized controller, a base station (BS), a radio access station, a node B, an evolved node B, a mobile multihop relay-BS, a base transceiver system (BTS), a site controller, etc., and may include some or all of the functions thereof.

A terminal may denote a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, etc., and may include some or all of the functions thereof.

Here, as the terminal, it is possible to use a desktop computer, a laptop computer, a tablet personal computer (PC), a wireless phone, a mobile phone, a smart phone, a smart watch, smart glasses, an e-book reader, a portable multimedia player (PMP), a portable game player, a navigation device, a digital camera, a digital multimedia broadcasting (DMB) player, a digital audio recorder, a digital audio player, a digital picture recorder, a digital picture player, a digital video recorder, a digital video player, etc. which can perform communication.

FIG. 1 is a conceptual diagram showing an example embodiment of a configuration of an IEEE 802.11 wireless local area network (WLAN) system.

Referring to FIG. 1, an IEEE 802.11 WLAN system includes at least one basic service set (BSS). The BSS denotes a set of STAs including STA1, STA2 (AP1), STA3, STA4, and STA5 (AP2) that are successfully synchronized to communicate with each other, and is not a concept denoting a specific area.

BSSs may be classified as infrastructure BSSs and independent BSSs (IBSSs), and BSS1 and BSS2 denote IBSSs. BSS1 may include a terminal STA1, an AP STA2 (AP1) that provides a distribution service, and a distribution system (DS) that connects the plurality of APs STA2 (AP1) and STA5 (AP2). In BSS1, the AP STA2 (AP1) may manage the terminal STA1.

BSS2 may include terminals STA3 and STA4, an AP STA5 (AP2) that provides a distribution service, and the DS that connects the plurality of APs STA2 (AP1) and STA5 (AP2). In BSS2, the AP STA5 (AP2) may manage the terminals STA3 and STA4.

Meanwhile, an IBSS is a BSS operating in an ad-hoc mode. Since an IBSS does not include any AP, there is no centralized management entity. In other words, in an IBSS, terminals are managed in a distributed manner. In an IBSS, all terminals may be mobile terminals, and constitute a self-contained network because access to the DS is not allowed.

The APs STA2 (AP1) and STA5 (AP2) may provide access to the DS through a wireless medium to the terminals STA1, STA3, and STA4 associated therewith. In BSS1 and BSS2, communication between the terminals STA1, STA3, and STA4 is generally performed through the APs STA2 (AP1) and STA5 (AP2). However, when a direct link is established, direct communication between the terminals STA1, STA3, and STA4 is possible.

A plurality of infrastructure BSSs may be connected to each other through a DS. The plurality of infrastructure BSSs connected through the DS is referred to as an extended service set (ESS). STAs included in the ESS may communicate with each other, and in the same ESS, terminals may move from one BSS to another BSS while seamlessly communicating.

A DS is a mechanism for one AP to communicate with another AP. Due to a DS, an AP may transmit a frame for terminals associated with a BSS managed by the AP, or transmit a frame for an arbitrary terminal having moved to another BSS. Also, an AP may exchange frames with an external network, such as a wired network. Such a DS is not necessarily a network and may have any form as long as it is possible to provide a predetermined distribution service defined in the IEEE 802.11 standards. For example, the DS may be a wireless network, such as a mesh network, or a physical structure that connects APs to each other.

Operation methods of a transmitting STA and a receiving STA performed in a WLAN according to example embodiments of the present invention to be described below may be applied not only to the above-described IEEE 802.11 WLAN system but also to a variety of networks including a mobile Internet such as a wireless personal area network (WPAN), a wireless body area network (WBAN), a wireless broadband Internet (WiBro), or a world interoperability for microwave access (WiMax), a 2nd generation (2G) mobile communication network such as a global system for mobile communication (GSM) network or a code division multiple access (CDMA) network, a 3rd generation (3G) mobile communication network such as a wideband code division multiple access (WCDMA) network or a CDMA2000 network, a 3.5th generation (3.5G) mobile communication network such as a high speed downlink packet access (HSDPA) network or a high speed uplink packet access (HSUPA) network, a 4th generation (4G) mobile communication network such as a Long Term Evolution (LTE) network or an LTE-advanced network, a 5th (5G) mobile communication network, and so on.

Next, MAC frame formats of a WLAN system will be described. MAC frames are generally classified as a data frame, a management frame, and a control frame. The data frame includes data to be transmitted to a terminal, and is transmitted from an upper layer to a terminal. The management frame is used to support an IEEE 802.11 service. The control frame is used to support transmission of the data frame and the management frame.

The management frame may denote an association request frame, an association response frame, a reassociation request frame, a reassociation response frame, a probe request frame, a probe response frame, a beacon frame, an authentication frame, an action frame, and so on.

The control frame may denote a block acknowledgement (ACK) request frame, a block ACK frame, a power save (PS)-poll frame, a request to send (RTS) frame, a clear to send (CTS) frame, an ACK frame, a contention free (CF)-end frame, and so on.

Figure 2:
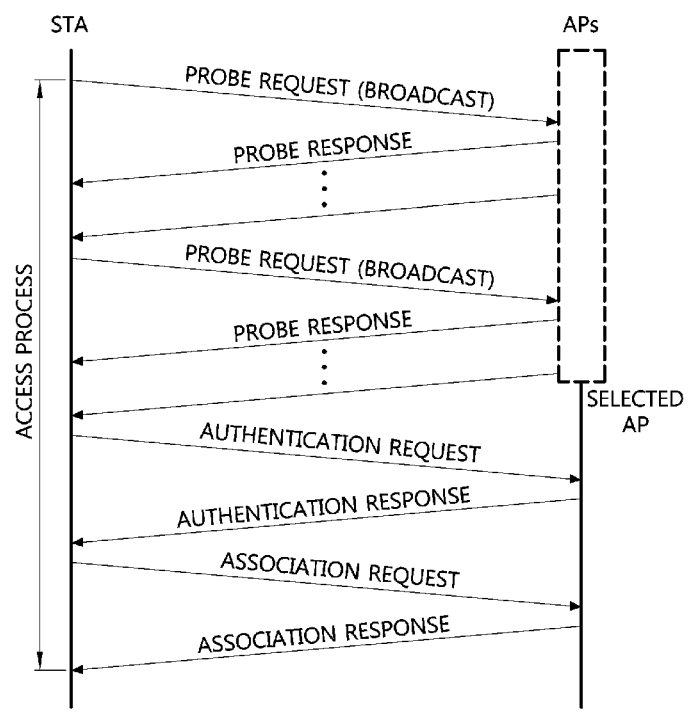
FIG. 2 is a conceptual diagram showing an access process of a terminal in an infrastructure basic service set (BSS)

FIG. 2 is a conceptual diagram showing an access process of a terminal in an infrastructure BSS. To transmit and receive data in an infrastructure BSS, a terminal STA is first required to access an AP.

Referring to FIG. 2, an access process of the terminal STA in the infrastructure BSS is generally divided into 1) a probe step of probing for an AP, 2) an authentication step with the probed AP, and 3) an association step of connecting to the AP having authenticated the terminal STA.

First, the terminal STA may probe for neighboring APs through a probe process. The probe process is classified according to a passive scanning method and an active scanning method. The passive scanning method may be performed by overhearing beacons transmitted by neighboring APs. On the other hand, the active scanning method may be performed by broadcasting a probe request frame. APs receiving the probe request frame may transmit probe response frames corresponding to the probe request frame to the terminal STA. The terminal STA receives the probe response frames, so that the presence of the neighboring APs may be known.

Subsequently, the terminal STA performs authentication with a probed AP, and may perform authentication with a plurality of probed APs. Authentication algorithms conforming to the IEEE 802.11 standards may be classified as an open system algorithm that exchanges two authentication frames and a shared key algorithm that exchanges four authentication frames. Through a process of exchanging an authentication request frame and an authentication response frame based on such an authentication algorithm, the terminal STA may perform authentication with an AP.

Finally, the terminal STA may select one of the authenticated plurality of APs and perform an association process with the selected AP. In other words, the terminal STA transmits an association request frame to the selected AP, and the AP receiving the association request frame transmits an association response frame corresponding to the association request frame to the terminal STA. In this way, through the process of exchanging the association request frame and the association response frame, the terminal STA may perform the association process with the AP.

Figure 3:
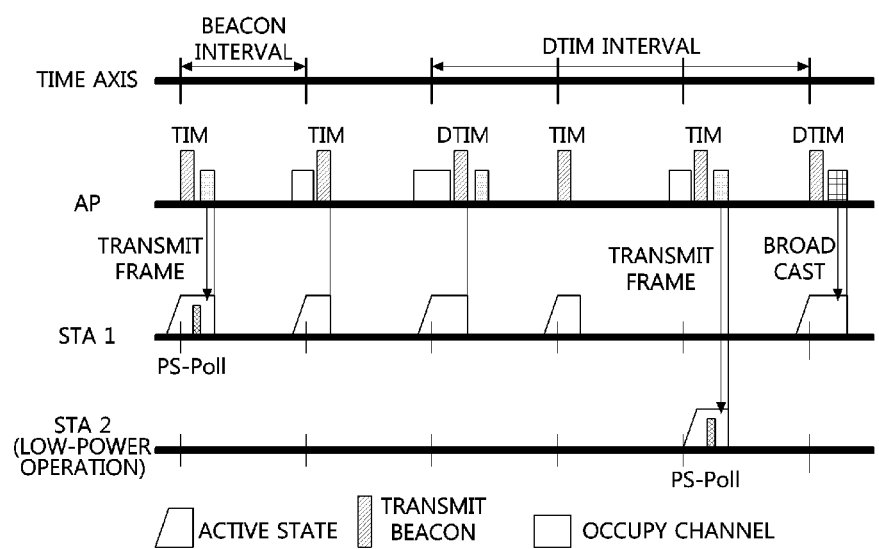
FIG. 3 is a conceptual diagram showing an example embodiment of a data transmission process of an access point (AP)

FIG. 3 is a conceptual diagram showing an example embodiment of a data transmission process of an AP.

Referring to FIG. 3, an AP periodically broadcasts a beacon, and may broadcast a beacon including a delivery traffic indication map (DTIM) at three beacon intervals. Terminals STA1 and STA2 periodically wake up from a power save mode (PSM) to receive the beacon, and check a traffic indication map (TIM) or the DTIM included in the beacon to determine whether data to be transmitted to the terminals STA1 and STA2 is buffered in the AP. Here, when there is the buffered data, the terminals STA1 and STA2 maintain an awake state and receives the data from the AP, and when there is no buffered data, the terminals STA1 and STA2 return to the PSM (i.e., a doze state).

In other words, when a bit in the TIM corresponding to an association identifier (AID) of the terminal STA1 or STA2 is set to 1, the terminal STA1 or STA2 transmits a PS-poll frame (or a trigger frame) that informs the AP that the terminal STA1 or STA2 is awake and ready to receive data, and the AP may determine that the terminal STA1 or STA2 is ready to receive the data by receiving the PS-poll frame and transmit the data or an ACK to the terminal STA1 or STA2. When transmitting the ACK to the terminal STA1 or STA2, the AP may transmit the data to the terminal STA1 or STA2 at an appropriate point in time. On the other hand, when the bit in the TIM corresponding to the AID of the terminal STA1 or STA2 is set to 0, the terminal STA1 or STA2 returns to the PSM.

Figure 4:
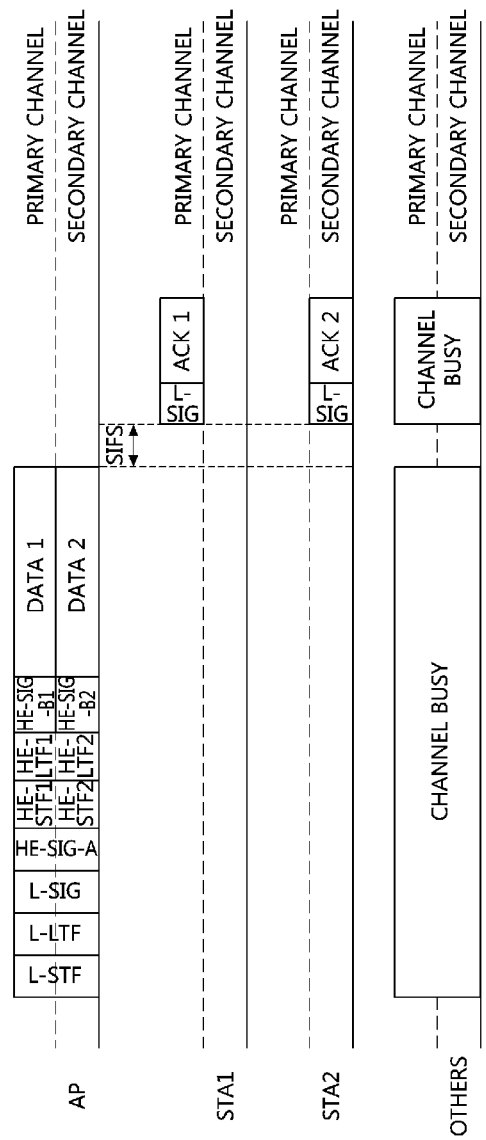
FIG. 4 is a timing diagram of an example embodiment illustrating an operation in which a transmitting station (STA) divides a bandwidth and transmits data units to a plurality of receiving STAs.

FIG. 4 is a timing diagram of an example embodiment illustrating an operation in which a transmitting STA (e.g., an AP) divides a bandwidth and transmits data units to a plurality of receiving STAs (e.g., STA1 and STA2).

FIG. 4 shows an operational example of a case in which a transmitting STA (AP) transmits data units to receiving STAs STA1 and STA2 using an orthogonal frequency division multiplexing access (OFDMA) scheme through a primary channel and a secondary channel, respectively. In OFDMA physical layer convergence procedure (PLCP) protocol data units (PPDUs) transmitted by the transmitting STA (AP), a legacy (L)-short training field (STF), an L-long training field (LTF), an L-signal (SIG) field, and a high efficiency (HE)-SIG-A field are transmitted through both the primary channel and the secondary channel, and thus the receiving STAs STA1 and STA2 receive the same L-STF, L-LTF, L-SIG field, and HE-SIG-A field. Also, HE-SIG-B fields and data units DATA1 and DATA2 are separately transmitted through the primary channel and the secondary channel, and each of the receiving STAs STA1 and STA2 may receive only an HE-SIG-B field and a data unit corresponding to a channel to be received by the receiving STA. The STAs STA1 and STA2 receiving the HE-SIG-B fields and the data units DATA1 and DATA2 through the channels to be received by the STAs STA1 and STA2 transmit ACKs after a short interframe space (SIFS) defined in the WLAN standards. At this time, the receiving STAs STA1 and STA2 transmit the ACKs through the channels of data units DATA1 and DATA2 received by the STAs STA1 and STA2.

STAs other than the receiving STAs STA1 and STA2 may receive a legacy preamble, and thus may recognize from the L-SIG fields that the primary channel and the secondary channels are in a busy state during an OFDMA PPDU period. Also, the ACKs transmitted by the respective receiving STAs STA1 and STA2 use the different channels but have the data units DATA1 and DATA2 of exactly the same content and length, thus having L-SIG fields of the same content. For this reason, the other STAs detect the L-SIG fields normally, and may recognize that the primary channel and the secondary channel are in the busy state during an ACK period. For the above operations, the HE-SIG-A fields of the OFDMA PPDUs include information about whether or not the corresponding PPDUs are OFDMA PPDUs, information on STAs capable of receiving the OFDMA PPDUs, and information about which channel is used by each STA. To provide the information on STAs capable of receiving the corresponding PPDUs, the transmitting STA AP groups STAs which simultaneously receive the OFDMA PPDUs in advance, and includes identification information of the OFDMA group capable of receiving the corresponding PPDUs in the HE-SIG-A fields. STAs receiving the OFDMA PPDUs may determine that the corresponding PPDUs may be received by the STAs when a group ID included in the corresponding PPDUs is identification information of an OFDMA group to which the STAs belong.

Figure 5:
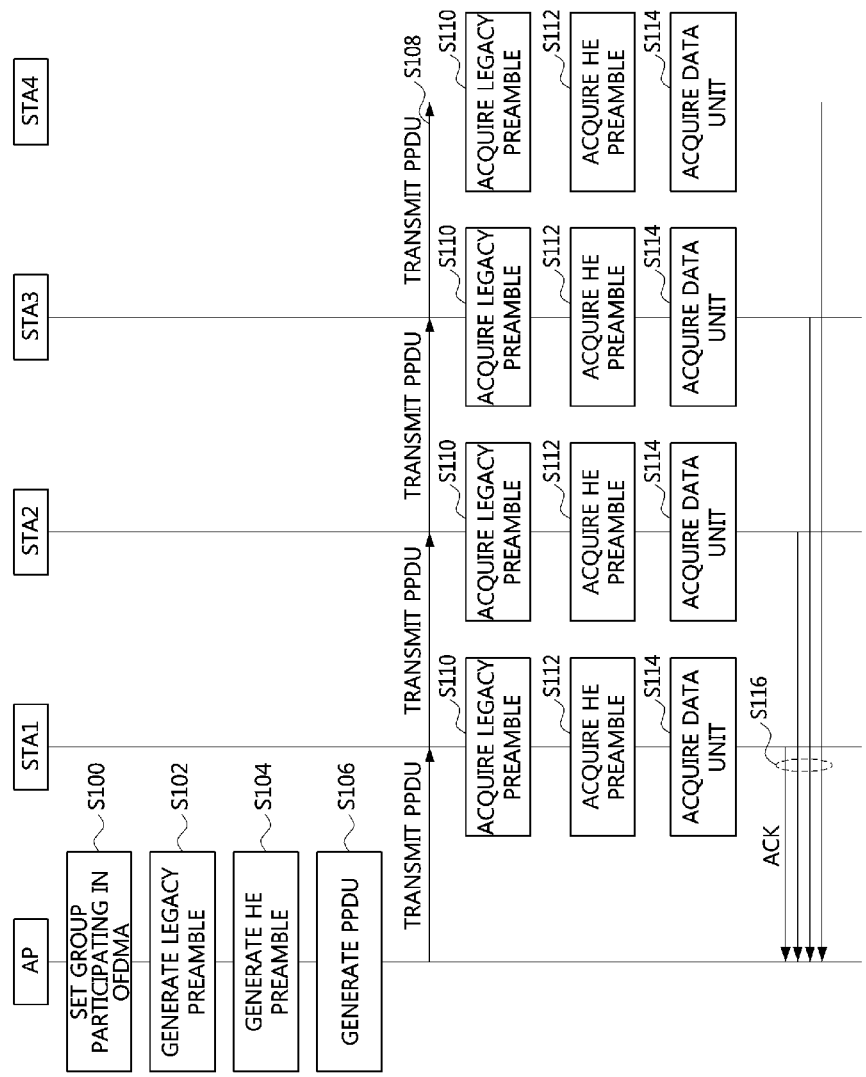
FIG. 5 is a sequence diagram illustrating an operation method of a STA in a WLAN according to an example embodiment of the present invention.

FIG. 5 is a sequence diagram illustrating an operation method of a STA in a WLAN according to an example embodiment of the present invention.

Referring to FIG. 5, a transmitting STA (i.e., referred to as AP, etc.) groups STAs capable of receiving an OFDMA PPDU in advance, and sets identification information (a group ID) for identifying the grouped receiving STAs (S100). Grouping of receiving STAs and setting of identification information may be performed according to occurrence of periodic and aperiodic events. For example, the transmitting STA may broadcast a signal for grouping to receiving STAs periodically or aperiodically, and set the same group identification information for receiving STAs that respond to the transmitted signal. Also, when a receiving STA enters the service area of the transmitting STA, group identification information of the receiving STA may be set. In FIG. 5, it is assumed that the grouped receiving STAs are STA1 to STA 4.

After operation S100, the transmitting STA generates a legacy preamble of an OFDMA PPDU (S102).

Figure 6:
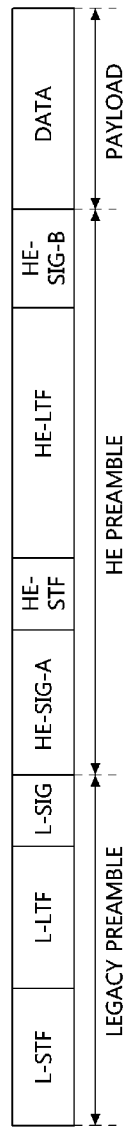
FIG. 6 is a conceptual diagram showing an example of a high efficiency (HE)-physical layer convergence procedure (PLCP) protocol data unit (PPDU) structure defined in IEEE 802.11ax which is a WLAN standard.

FIG. 6 is a conceptual diagram showing an example of an HE-PPDU structure defined in IEEE 802.11ax which is a WLAN standard.

Referring to FIG. 6, an HE-PPDU may include a legacy preamble, an HE preamble, and a payload. The legacy preamble may include information for supporting timing synchronization, carrier offset recovery, and channel estimation performed by a STA receiving the HE-PPDU.

The legacy preamble may include an L-STF, an L-LTF, and an L-SIG field. The L-STF may include information for carrier sensing for sensing that a signal is in a currently used channel, automatic gain control for tuning a wireless signal input to an antenna to operation regions of an analog circuit and an analog-to-digital converter, and correction of a coarse carrier frequency offset. The L-LTF may include information for finer carrier frequency offset correction and symbol synchronization, and information for channel response estimation for demodulation of the L-SIG field and HE-SIG fields. By using a repetitive sequence, such as an L-STF and an L-LTF, it is possible to estimate various characteristics, such as interference, Doppler shift, and delay spread, of a channel. The L-SIG field may include control information required for a STA receiving the HE-PPDU to demodulate the HE-PPDU. For example, the L-SIG field may include a packet length, modulation and coding schemes (MCSs), a bandwidth, and information supporting a channel encoding scheme, beamforming, space time block codes (STBCs), smoothing, multi-user multiple-input multiple-output (MU-MIMO), and so on.

After operation S102, the transmitting STA generates an HE preamble including scheduling information for a plurality of receiving STAs (S104). The HE preamble may include information for supporting timing synchronization, carrier offset recovery, and channel estimation performed by a STA receiving the HE-PPDU.

Referring to FIG. 6, the HE preamble may include an HE-STF, at least one HE-LTF, an HE-SIG-A field, and an HE-SIG-B field. The HE-STF and the HE-LTF may include information corresponding to the aforementioned L-STF and L-LTF. Also, the HE-SIG-A field and the HE-SIG-B field may separately include common control information and dedicated information required for a specific receiving STA group.

The HE-SIG-A field may include information about whether or not the HE-PPDU is an OFDMA PPDU, group identification information of receiving STAs capable of receiving the OFDMA PPDU, scheduling information about which bands are used by the respective receiving STAs, and so on.

Figure 7:
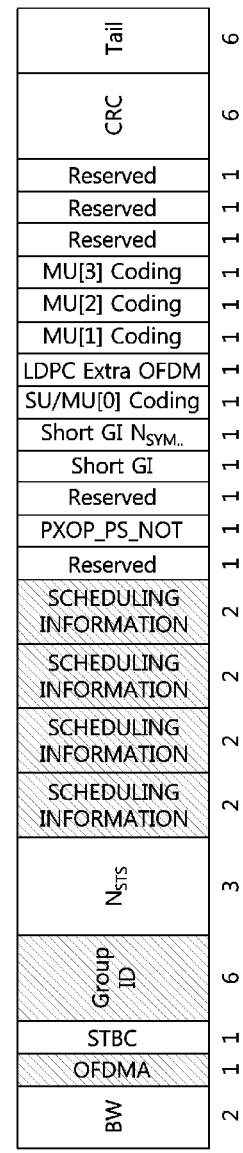
FIG. 7 is a conceptual diagram showing an example of an HE-signal (SIG)-A field shown in FIG. 6.

FIG. 7 is a conceptual diagram showing an example of an HE-SIG-A field shown in FIG. 6. Referring to FIG. 7, the HE-SIG-A field may include an OFDMA indicator field, a field regarding group identification information (group ID), a scheduling information field, and information fields belonging to a conventional HE-SIG-A field.

The OFDMA indicator field is an information field indicating that the transmission frame is transmitted using the OFDMA scheme, and may include the information "ENABLE" of OFDMA when the corresponding HE-PPDU is a transmission frame based on OFDMA.

The group identification information field is an identification information field regarding a group of a plurality of receiving STAs, and may include information on a group ID of receiving STAs capable of receiving an OFDMA PPDU. STAs receiving an OFDMA PPDU may recognize that the corresponding PPDU is a PPDU to be received by the STAs when a group ID included in the PPDU is identification information of an OFDMA group to which the STAs belong.

The scheduling information field may include scheduling information for frequency bands usable by each of the plurality of receiving STAs.

Figure 8:
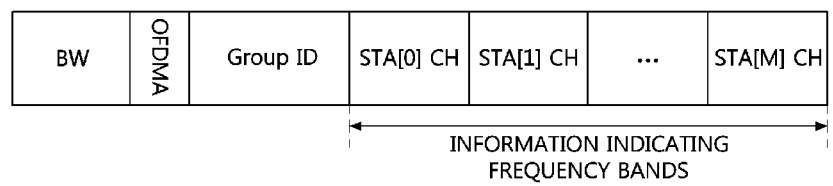
FIG. 8 is a conceptual diagram illustrating an example of a scheduling information field included in an HE-SIG-A field.

FIG. 8 is a conceptual diagram illustrating an example of a scheduling information field included in an HE-SIG-A field.

Referring to FIG. 8, a scheduling information field may include information indicating frequency bands respectively assigned to a plurality of receiving STAs. Here, the information indicating frequency bands is information of frequency bands which are usable by each of the receiving STAs included in an OFDMA group in the available bandwidth of a BSS. Therefore, when one OFDMA group includes M receiving STAs and the available bandwidth of the corresponding BSS includes N unit bands, there is information indicating the N frequency bands for each of the M receiving STAs. Such information indicating frequency bands may be expressed as a bitmap. For example, it is assumed that the available bandwidth of the corresponding BSS is 80 MHz and OFDMA is enabled. Also, it is assumed that the bandwidth of unit bands is 20 MHz, a first STA STA[0] of the corresponding OFDMA group uses the first 20 MHz, a second STA STA[1] uses the next 40 MHz, a third STA STA[2] uses no frequency band, and a fourth STA STA[3] uses the last 20 MHz. According to these assumptions, a bandwidth (BW) field in the HE-SIG-A field may include bandwidth information "80 MHz," a OFDMA field may include the information "ENABLE" of OFDMA, a group identification information field (group ID) may include the corresponding group ID, and a scheduling information field may include the bitmap information "1000," "0110," "0000," and "0001" of the STAs STA[0] to STA[3] as information indicating frequency bands. Therefore, due to the bitmap information "1000," it is possible to know that the first STA STA[0] may use 20 MHz corresponding to the first unit band in the available bandwidth of 80 MHz. Due to the bitmap information "0110," it is possible to know that the second STA STA[1] may use 40 MHz corresponding to the second and third unit bands in the available bandwidth of 80 MHz. Due to the bitmap information "0000," it is possible to know that the third STA STA[2] has no available band in the available bandwidth of 80 MHz. Due to the bitmap information "0001," it is possible to know that the fourth STA STA[3] may use 20 MHz corresponding to the last, that is, the fourth unit band in the available bandwidth of 80 MHz.

Figure 9:
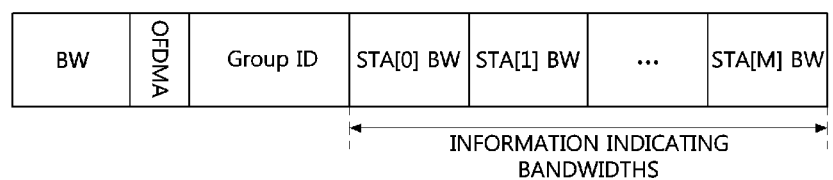
FIG. 9 is a conceptual diagram illustrating another example of a scheduling information field included in an HE-SIG-A field.

FIG. 9 is a conceptual diagram illustrating another example of a scheduling information field included in an HE-SIG-A field.

Referring to FIG. 9, a scheduling information field may include information indicating the bandwidths of frequency bands respectively assigned to a plurality of receiving STAs. Here, the information indicating the bandwidths is sequential frequency bandwidth information of bands which are usable by each of the receiving STAs included in an OFDMA group in the available bandwidth of a BSS. For example, it is assumed that the available bandwidth of the corresponding BSS is 80 MHz and the bandwidth of unit bands is 20 MHz. Also, it is assumed that a first STA STA[0] of the corresponding OFDMA group uses the first 20 MHz, a second STA STA[1] uses the next 40 MHz, a third STA STA[2] uses no frequency band, and a fourth STA STA[3] uses the last 20 MHz. According to these assumptions, a scheduling information field in the HE-SIG-A field may include the information "20 MHz," "40 MHz," "0 MHz," and "20 MHz" respectively in a STA[0] BW field to a STA[3] BW field as information indicating the bandwidths of the STAs STA[0] to STA[3].

Figure 10:
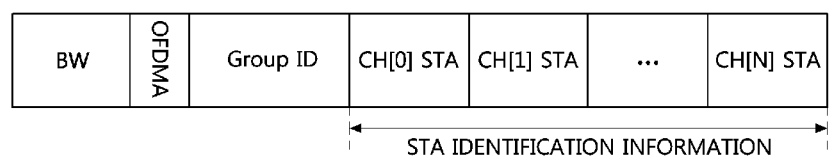
FIG. 10 is a conceptual diagram illustrating still another example of a scheduling information field included in an HE-SIG-A field.

FIG. 10 is a conceptual diagram illustrating still another example of a scheduling information field included in an HE-SIG-A field.

Referring to FIG. 10, a scheduling information field may include identification information of a plurality of receiving STAs respectively assigned a plurality of frequency bands. Here, the STA identification information is identification information of each of the receiving STAs capable of using each of unit bands in the available bandwidth of a BSS among receiving STAs included in an OFDMA group. Here, the STA identification information may include AIDs, partial AIDS (PAIDs), minimum unit identifiers randomly designated for the receiving STAs or so on. The AIDs or PAIDs denote information, such as IDs, assigned for the transmitting STA to identify each of the plurality of receiving STAs in the BSS. Also, the randomly designated minimum unit identifiers denote identification information of the plurality of receiving STAs expressed with the minimum number of bits. For example, it is assumed that the available bandwidth of the corresponding BSS is 80 MHz and the bandwidth of unit bands is 20 MHz. Also, it is assumed that a first STA STA[0] of the corresponding OFDMA group uses the first 20 MHz, a second STA STA[1] uses the next 40 MHz, a third STA STA[2] uses no frequency band, and a fourth STA STA[3] uses the last 20 MHz. According to these assumptions, a scheduling information field in the HE-SIG-A field may include the information "STA0," "STA1," "STA1," and "STA3" respectively in CH[0] STA to CH[3] STA as STA identification information of unit bands CH[0] STA to CH[3] STA.

After operation S104, the transmitting STA generates a PPDU including the legacy preamble, the HE preamble, and a payload (S106). The payload may include a data unit.

Figure 11:
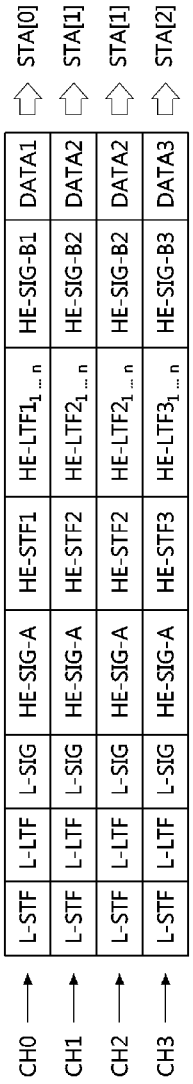
FIG. 11 is a conceptual diagram illustrating an example of an orthogonal frequency division multiplexing access (OFDMA) PPDU generated by a transmitting STA.

FIG. 11 is a conceptual diagram illustrating an example of an OFDMA PPDU generated by a transmitting STA.

FIG. 11 shows examples of OFDMA PPDUs each to be transmitted through unit bands CH0 to CH3 each having a bandwidth of 20 MHz when the available bandwidth of the corresponding BSS is 80 MHz. An OFDMA PPDU which will be transmitted through 20 MHz of the unit band CH0 includes the same legacy preamble and HE-SIG-A field as other OFDMA PPDUs, and may include HE-STF1, HE-STF1$_{1, \ldots, n}$, HE-SIG-B1 fields in an HE preamble and DATA1 as unique fields. An OFDMA PPDU to be transmitted through 40 MHz of the unit bands CH1 and CH2 includes the same legacy preamble and HE-SIG-A field as other OFDMA PPDUs, and may include HE-STF2, HE-STF2$_{1, \ldots, n}$, HE-SIG-B2 fields in an HE preamble and DATA2 as unique fields. An OFDMA PPDU which will be transmitted through 20 MHz of the unit band CH3 includes the same legacy preamble and HE-SIG-A field as other OFDMA PPDUs, and may include HE-STF3, HE-STF3$_{1, \ldots, n}$, HE-SIG-B3 fields in an HE preamble and DATA3 as unique fields.

After operation S106, the transmitting STA transmits the generated PPDU to each of the receiving STAs using the OFDMA scheme (S108). Referring to FIG. 11, among the fields of the OFDMA PPDU, the L-STF, L-LTF, and L-SIG fields corresponding to the legacy preamble and the HE-SIG-A field corresponding to the HE preamble are transmitted to the receiving STAs STA[0] to STA[2] in common, and a unique HE-STF, at least one unique HE-LTF, a unique HE-SIG-B field of the HE preamble and a unique data unit are transmitted to the receiving STAs STA[0] to STA[2].

After operation S108, each of the receiving STAs (i.e., referred to as a terminal, etc.) acquires the legacy preamble of the PPDU transmitted from the transmitting STA (S110).

The receiving STAs may receive the PPDU using the OFDMA scheme, and acquire the legacy preamble in the received PPDU. Here, the acquired legacy preamble may include an L-STF, an L-LTF, an L-SIG field, etc., as information for supporting timing synchronization, carrier offset recovery, or channel estimation performed by the receiving STAs.

After operation S110, each of the receiving STAs acquires the HE preamble (S112). The HE preamble may include an HE-SIG-A field, an HE-STF, at least one HE-LTF, an HE-SIG-B field, and so on. In particular, the HE-SIG-A field may include an OFDMA indicator field as information for providing a notification of whether or not the corresponding HE-PPDU is an OFDMA PPDU. Also, the HE-SIG-A field may include a field regarding group identification information (group ID) of a group of receiving STAs capable of receiving an OFDMA PPDU. Further, the HE-SIG-A field may include a scheduling information field regarding which bands may be used by STAs receiving an OFDMA PPDU. Such a scheduling information field may include information indicating frequency bands, information indicating the bandwidths of frequency bands, STA identification information of a plurality of receiving STAs assigned a plurality of frequency bands, or so on.

After operation S112, the respective receiving STAs acquire at least one data unit included in the payload of the PPDU through resources indicated by scheduling information for the plurality of receiving STAs included in the HE preamble (S114).

Each of the receiving STAs may acquire the data unit based on information indicating frequency bands respectively assigned to the plurality of STAs as information of the HE preamble. Such information indicating frequency bands may be expressed as a bitmap. Therefore, when the information indicating the frequency bands includes information on a frequency band which is usable by a receiving STA, the receiving STA may acquire the data unit included in the payload of the PPDU received through the corresponding frequency band.

Also, the receiving STAs may acquire the data unit based on information indicating the bandwidths of frequency bands respectively assigned to the plurality of STAs as information of the HE preamble. In other words, when it is determined that bandwidth information indicates a frequency bandwidth usable by a receiving STA, the receiving STA may acquire the data unit included in the payload of the PPDU received through the corresponding bandwidth.

Further, the receiving STAs may acquire the data unit based on identification information of the plurality of receiving STAs respectively assigned a plurality of frequency bands as information of the HE preamble. In other words, when it is determined that STA identification information is identification information corresponding to a receiving STA, the receiving STA may acquire the data unit included in the payload of the PPDU received through a frequency band corresponding to the STA identification information.

After operation S114, the respective receiving STAs transmit ACKs to the transmitting STA subsequent to an SIFS (S116). Accordingly, STAs other than the receiving STAs may recognize that frequency bands used by the receiving STAs are in the busy state during an ACK period.

According to example embodiments of the present invention, a WLAN device (an AP or a transmitting STA) can simultaneously transmit data to two or more devices (a terminal and a receiving STA) through different frequency bands using the OFDMA technology. Therefore, it is possible to efficiently use a wide bandwidth while maintaining backward compatibility with devices which use narrow bandwidths for data transmission.

Methods according to example embodiments of the present invention may be implemented in the form of program instructions which are executable using a variety means of computing, and recorded in a computer-readable record medium. The computer-readable record medium may include program instructions, data files, data structures, etc., alone or in combination. The program instructions recorded in the computer-readable record medium may be specially designed for the present invention, or may be known to those of ordinary skill in the computer software field.

Examples of the computer-readable record medium may include a hardware device specially configured to store and execute the program instructions, such as a read only memory (ROM), a random access memory (RAM), and a flash memory. Examples of the program instructions may include machine language codes which are made by a compiler, and high-level language codes which are executable by a computer using an interpreter or so on. The hardware device may be configured to operate as one or more software modules to perform the method according to example embodiments of the present invention, and vice versa.

While the example embodiments of the present invention and their advantages have been described in detail, it should be understood that various changes, substitutions and alterations may be made herein without departing from the scope of the invention.

What is claimed is:

1. A processor implemented operation method of a station (STA) in a wireless local area network (WLAN), the operation method comprising:
generating a legacy preamble;
generating a high efficiency (HE) preamble including an HE-signal (SIG)-A field that includes scheduling information for a plurality of receiving STAs;
generating a physical layer convergence procedure (PLCP) protocol data unit (PPDU) including the legacy preamble, the HE preamble, and a payload; and
transmitting the generated PPDU to each of the plurality of receiving STAs.

2. The operation method of claim 1, wherein the HE preamble includes an HE-short training field (STF), at least one HE-long training field (LTF), and an HE-SIG-B field.

3. The operation method of claim 1, wherein the HE preamble includes an indicator indicating that the PPDU is transmitted using an orthogonal frequency division multiplexing access (OFDMA) scheme.

4. The operation method of claim 1, wherein the HE preamble includes identification information of a group to which the plurality of receiving STAs belong.

5. The operation method of claim 1, wherein the scheduling information includes information indicating frequency bands respectively assigned to the plurality of receiving STAs.

6. The operation method of claim 1, wherein the scheduling information includes information indicating bandwidths of frequency bands respectively assigned to the plurality of receiving STAs.

7. The operation method of claim 1, wherein the scheduling information includes identification information of the plurality of receiving STAs respectively assigned a plurality of frequency bands.

8. The operation method of claim 1, further comprising using an orthogonal frequency division multiplexing access (OFDMA) scheme for the transmitting of the generated PPDU.

9. A processor implemented operation method of a first station (STA) in a wireless local area network (WLAN), the operation method comprising:
receiving a physical layer convergence procedure (PLCP) protocol data unit (PPDU) from a second STA;
acquiring a legacy preamble of the PPDU;
acquiring a high efficiency (HE) preamble of the PPDU; and
acquiring at least one data unit included in a payload of the PPDU through resources indicated by scheduling information for a plurality of receiving STAs, the scheduling information being included in an HE-signal (SIG)-A field of the HE preamble.

10. The operation method of claim 9, wherein the HE preamble includes an HE-short training field (STF), at least one HE-long training field (LTF), and an HE-SIG-B field.

11. The operation method of claim 9, wherein the HE preamble includes an indicator indicating that the PPDU is transmitted using an orthogonal frequency division multiplexing access (OFDMA) scheme.

12. The operation method of claim 9, wherein the HE preamble includes identification information of a group to which the plurality of receiving STAs belong.

13. The operation method of claim 9, wherein the scheduling information includes information indicating frequency bands respectively assigned to the plurality of receiving STAs.

14. The operation method of claim 9, wherein the scheduling information includes information indicating bandwidths of frequency bands respectively assigned to the plurality of receiving STAs.

15. The operation method of claim 9, wherein the scheduling information includes identification information of the plurality of receiving STAs respectively assigned a plurality of frequency bands.

16. The operation method of claim 9, further comprising using an orthogonal frequency division multiplexing access (OFDMA) scheme for the receiving of the PPDU.

* * * * *